US009110987B2

(12) United States Patent
Gutstadt et al.

(10) Patent No.: US 9,110,987 B2
(45) Date of Patent: *Aug. 18, 2015

(54) SYSTEM AND METHOD FOR PROVIDING MUSIC

(75) Inventors: Jared Gutstadt, New York, NY (US); Daniel Demole, New York, NY (US)

(73) Assignee: JPM Music, LLC, New York, NY (US)

(*) Notice: Subject to any disclaimer, the term of this patent is extended or adjusted under 35 U.S.C. 154(b) by 66 days.

This patent is subject to a terminal disclaimer.

(21) Appl. No.: 13/462,947

(22) Filed: May 3, 2012

(65) Prior Publication Data

US 2012/0215332 A1      Aug. 23, 2012

Related U.S. Application Data

(63) Continuation of application No. 12/627,411, filed on Nov. 30, 2009, now Pat. No. 8,429,181.

(60) Provisional application No. 61/257,257, filed on Nov. 2, 2009.

(51) Int. Cl.
G06F 17/30 (2006.01)
G06F 7/00 (2006.01)

(52) U.S. Cl.
CPC .... *G06F 17/30749* (2013.01); *G06F 17/30867* (2013.01); *G06F 17/30038* (2013.01); *G06F 17/30053* (2013.01); *G06F 17/30864* (2013.01); *G06F 17/30979* (2013.01)

(58) Field of Classification Search
CPC ............... G06F 17/30867; G06F 17/30038; G06F 17/30053; G06F 17/30864; G06F 17/30979

USPC ........................................... 707/76, 802, 769
See application file for complete search history.

(56) References Cited

U.S. PATENT DOCUMENTS

| 2004/0220926 | A1  | 11/2004 | Lamkin et al. |
| 2005/0231513 | A1* | 10/2005 | LeBarton et al. ............. 345/473 |
| 2006/0089949 | A1  | 4/2006  | Robbin et al. |
| 2008/0201348 | A1* | 8/2008  | Edmonds et al. ............. 707/101 |
| 2008/0208692 | A1* | 8/2008  | Garaventi et al. ............. 705/14 |

(Continued)

OTHER PUBLICATIONS

Brownlow et al. "Collective licensing of online music in Europe", Nov. 2008, Intellectual Asset Management, pp. 69-72, www.iam-magazine.com.

(Continued)

*Primary Examiner* — Kuen Lu
(74) *Attorney, Agent, or Firm* — Brian J. Colandreo; Michael T. Abramson; Holland & Knight LLP

(57) ABSTRACT

The present disclosure includes a system, method, and computer program product for providing music. A method in accordance with one particular embodiment may include storing a plurality of cues in a memory, each of the plurality of cues having a plurality of tags associated therewith. The plurality of tags may include both musical and non-musical tags. The method may further include receiving an input at a computing device, the input corresponding to at least one of the plurality of tags. The method may also include searching the memory of the computing device to locate at least one of the plurality of cues having at least one tag that corresponds to the input. The method may further include providing a cue having the at least one tag that corresponds to the input to a client device. Numerous other embodiments are also within the scope of the present disclosure.

20 Claims, 11 Drawing Sheets

(56) References Cited

U.S. PATENT DOCUMENTS

| | | |
|---|---|---|
| 2008/0257134 A1 | 10/2008 | Oppenheimer |
| 2008/0263099 A1 | 10/2008 | Brady-Kalnay et al. |
| 2009/0069911 A1* | 3/2009 | Stefik .............................. 700/94 |
| 2009/0150827 A1* | 6/2009 | Meyer et al. .................. 715/810 |
| 2009/0325602 A1 | 12/2009 | Higgins et al. |
| 2010/0161620 A1* | 6/2010 | Lamere et al. ................ 707/749 |
| 2011/0106827 A1 | 5/2011 | Gutstadt et al. |
| 2011/0106838 A1 | 5/2011 | Gutstadt et al. |

OTHER PUBLICATIONS

Notice of Allowance Received in U.S. Appl. No. 12/627,411 mailed Feb. 16, 2012 and updated search listings provided therewith.

* cited by examiner

THE JINGLE PLAYER
THE SMART PRODUCTION MUSIC DATABASE )))

| Settings | Help | Logout |

Now Playing:

|◄◄ ▷ ▷▷|          + Fav | ↓ Get | ⬜ Edit | Request

00:00/00:00

Acoustic [GO]

Jingle Filters [RESET]

Type - Both ▽
Genre - (None) ▽
Sub Genre - (None) ▽
Tempo - (None) ▽
Mood - (None) ▽

Artist Info    Suggestions

Search Results     Deeem ⊗

| + Tab | Acoustic | | | |
|---|---|---|---|---|
| | Title | Mood | Genre | Data Add |
| ⬜ | 61 Reissue-JP | Dramatic | Pop | 2012-01-0C [GET FAV] |
| ⬜ | American Pickers 3-JP | None | Americana | 2009-10-20 [GET FAV] |
| ⬜ | American Pickers 3b-JP | None | Americana | 2009-10-20 [GET FAV] |
| ⬜ | American Pickers 6-JP | None | Americana | 2009-10-20 [GET FAV] |
| ⬜ | American Pickers 5-JP | Positive | Americana | 2009-10-20 [GET FAV] |
| ⬜ | Olde Tyme-JP | None | Americana | 2009-10-20 [GET FAV] |
| ⬜ | American Pickers 19-JP | | | |
| ⬜ | Passing-JP | Reflective | Folk | 2009-10-20 [GET FAV] |

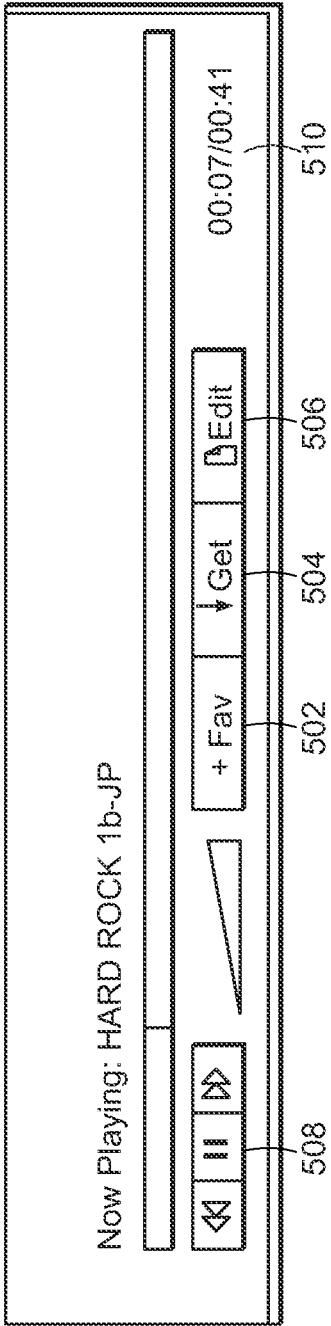

FIG. 11

Request

Request is like having a group of composers working for you. Just enter in your project details and one of Jingle Punks' musicologists will build a new bin for you with selections that match your needs. If we don't have specifically what you're looking for, we'll do our best to have our composers whip up tracks for you on the spot - at no extra charge to you!

Required*

Project Name *
Due Date *
Type    Instrumental ▶
Genre   None ▶
SubGenre None ▶
Tempo   None ▶
Mood    None ▶
Tags
Description *

CANCEL    SUBMIT

SYSTEM AND METHOD FOR PROVIDING MUSIC

RELATED APPLICATIONS

The subject application is a continuation application of U.S. patent application with Ser. No. 12/627,411, filed 30 Nov. 2009, which claims the benefit of U.S. Provisional Patent Application with Ser. No. 61/257,257, filed 2 Nov. 2009, the entire contents of which are herein incorporated by reference.

TECHNICAL FIELD

This disclosure generally relates to systems and method for providing music. More specifically, the present disclosure is directed towards a system and method for providing pre-licensed music.

BACKGROUND

Music licensing is a rapidly growing and expanding market within the music industry, as well as in the more general categories of entertainment and communications. With large amounts of new media content on television, film and in new media like the web, mobile devices and more, there is a substantial increase in demand for hip, high quality and affordable music to enhance this content. Television has now become the number one place where people discover new music.

The process for licensing music is often extremely cumbersome. Complex negotiations had to take place between the media user, lawyers, agents and the artists. Even with far less media (i.e., fewer channels and fewer shows on each) it was an inefficient process to negotiate. We now live in a media saturated universe with over 1000 channels, media on the web and advertising in every imaginable place from taxicabs to bathroom kiosks. The concept of pre-licensed stock music developed from this, providing basic music to content producers.

Pre-licensed music is a good fit with network and cable business models because of the boom of reality programs that requires wall-to-wall music to help heighten the drama, comedy or tension of otherwise mundane events. This trend has spilled into every network and is the cornerstone of many networks. Many television shows are much more likely to use stock music as a source because sourcing music directly from a composer is too time consuming and expensive.

Pioneers in the stock music industry created simple delivery methods to accommodate the rapidly expanding media marketplace by using compact discs (CDs), hard drives and HTML pages to share music with clients. Media producers are (more and more) looking for increased speed in delivery, and now real-time delivery methods are becoming sought after. Additionally, content producers need to stand out from the saturated media markets and quality is making a comeback. The market wants everything: low cost, real-time speed and high quality.

As we move into the next wave of media that may allow user generated content to proliferate on the web, mobile devices and beyond, regulations may soon follow and there may be a need for pre-cleared music in this arena too. Soon, amateur content makers may need the same music licensing tools that the professionals have so that the content they create will not be in violation of copyright laws.

In the United States there are over 1,000 television channels producing tens of thousands of shows, 11,000 commercial radio stations, 1,200 feature films, tens of thousands of advertisements and millions of web content pieces. Each needs music or sound accompaniment. The two major rights organizations in the US (i.e., BMI and ASCAP) paid more than $1.4 billion in royalties in 2006. This figure is growing rapidly and projects to top $2 billion in 2010. As royalty regulations are put in place for web content this growth curve may continue to increase.

It is often the music producer who may be tasked with the role of identifying and locating the proper music for these television shows, radio programs, etc. In this way, music producers may be required to find appropriate music in order to meet quick deadlines and within tight budgets. Moreover, they often need to be able to immediately access the music to begin editing without worrying about licensing contracts or fees.

SUMMARY OF DISCLOSURE

In a first implementation of this disclosure a system for providing music is provided. In some embodiments, the system may include a memory including a plurality of cues, each of the plurality of cues having a plurality of tags associated therewith. The plurality of tags may include both musical and non-musical tags. The system may also include a computing device configured to receive an input corresponding to at least one of the plurality of tags. The computing device may be further configured to search the memory to locate at least one of the plurality of cues having at least one tag that corresponds to the input. The computing device may also be configured to provide a cue having the at least one tag that corresponds to the input to a client device One or more of the following features may be included. In some embodiments, the input may be a non-musical search term and the licensing system may be a pre-licensed music licensing system.

In some embodiments, the computing device may be configured to provide a plurality of search results in a multiple tab format and to allow for an audition of at least one of the plurality of cues at the client device. The computing device may be further configured to allow for the download of at least one of the plurality of cues at the client device. The computing device may also be configured to provide a suggestion of an additional search term based upon, at least in part, the input. The suggestion may be determined in accordance with at least one of a categorization algorithm and a custom recommendation.

In some embodiments, the computing device may be further configured to allow for the creation of at least one playlist. The computing device may be further configured to enable the sharing of the at least one playlist. The computing device may also be configured to receive a request for a recommendation pertaining to a particular type of music and to provide the recommendation to the client device.

In another implementation of the present disclosure a method is provided. The method may include storing a plurality of cues in a memory of a computing device, each of the plurality of cues having a plurality of tags associated therewith, the plurality of tags including both musical and non-musical tags. The method may further include receiving an input at the computing device, the input corresponding to at least one of the plurality of tags. The method may also include searching the memory of the computing device to locate at least one of the plurality of cues having at least one tag that corresponds to the input and providing a cue having the at least one tag that corresponds to the input to a client device.

One or more of the following features may be included. The method may additionally include providing a plurality of search results in a multiple tab format and allowing for an audition of at least one of the plurality of cues at the client device. In some embodiments, the input may be a non-musical search term and the licensing system may be a pre-licensed music licensing system.

The method may further include allowing for the download of at least one of the plurality of cues at the client device. The method may additionally include suggesting an additional search term based upon, at least in part, the input. Suggesting may be performed in accordance with at least one of a categorization algorithm and a custom recommendation.

In some embodiments, the method may further include allowing for the creation of at least one playlist and enabling the sharing of the at least one playlist. The method may also include receiving a request for a recommendation pertaining to a particular type of music and providing the recommendation to the client device.

In yet another implementation of the present disclosure a computer program product is provided. The computer program product may reside on a computer readable medium having a plurality of instructions stored thereon which, when executed by a processor, cause the processor to perform operations. In some embodiments, operations may include storing a plurality of cues in a memory of a computing device, each of the plurality of cues having a plurality of tags associated therewith, the plurality of tags including both musical and non-musical tags. The method may further include receiving an input at the computing device, the input corresponding to at least one of the plurality of tags. The method may also include searching the memory of the computing device to locate at least one of the plurality of cues having at least one tag that corresponds to the input and providing a cue having the at least one tag that corresponds to the input to a client device.

Operations may further include providing a plurality of search results in a multiple tab format and allowing for an audition of at least one of the plurality of cues at the client device. In some embodiments, the input may be a non-musical search term and the licensing system may be a pre-licensed music licensing system.

Operations may further include allowing for the download of at least one of the plurality of cues at the client device. Operations may additionally include suggesting an additional search term based upon, at least in part, the input. Suggesting may be performed in accordance with at least one of a categorization algorithm and a custom recommendation.

In some embodiments, operations may further include allowing for the creation of at least one playlist and enabling the sharing of the at least one playlist. Operations may also include receiving a request for a recommendation pertaining to a particular type of music and providing the recommendation to the client device.

The details of one or more implementations are set forth in the accompanying drawings and the description below. Other features and advantages will become apparent from the description, the drawings, and the claims.

BRIEF DESCRIPTION OF THE DRAWINGS

FIG. 2 is an exemplary embodiment depicting portions of the music providing process of the present disclosure;

FIG. 5 is an exemplary embodiment depicting portions of the music providing process of the present disclosure.

FIG. 6 is an exemplary embodiment depicting portions of the music providing process of the present disclosure.

FIG. 11 is an exemplary embodiment depicting portions of the music providing process of the present disclosure.

Like reference symbols in the various drawings, in some cases, may indicate like elements.

DETAILED DESCRIPTION OF THE PREFERRED EMBODIMENTS

Figure 1:
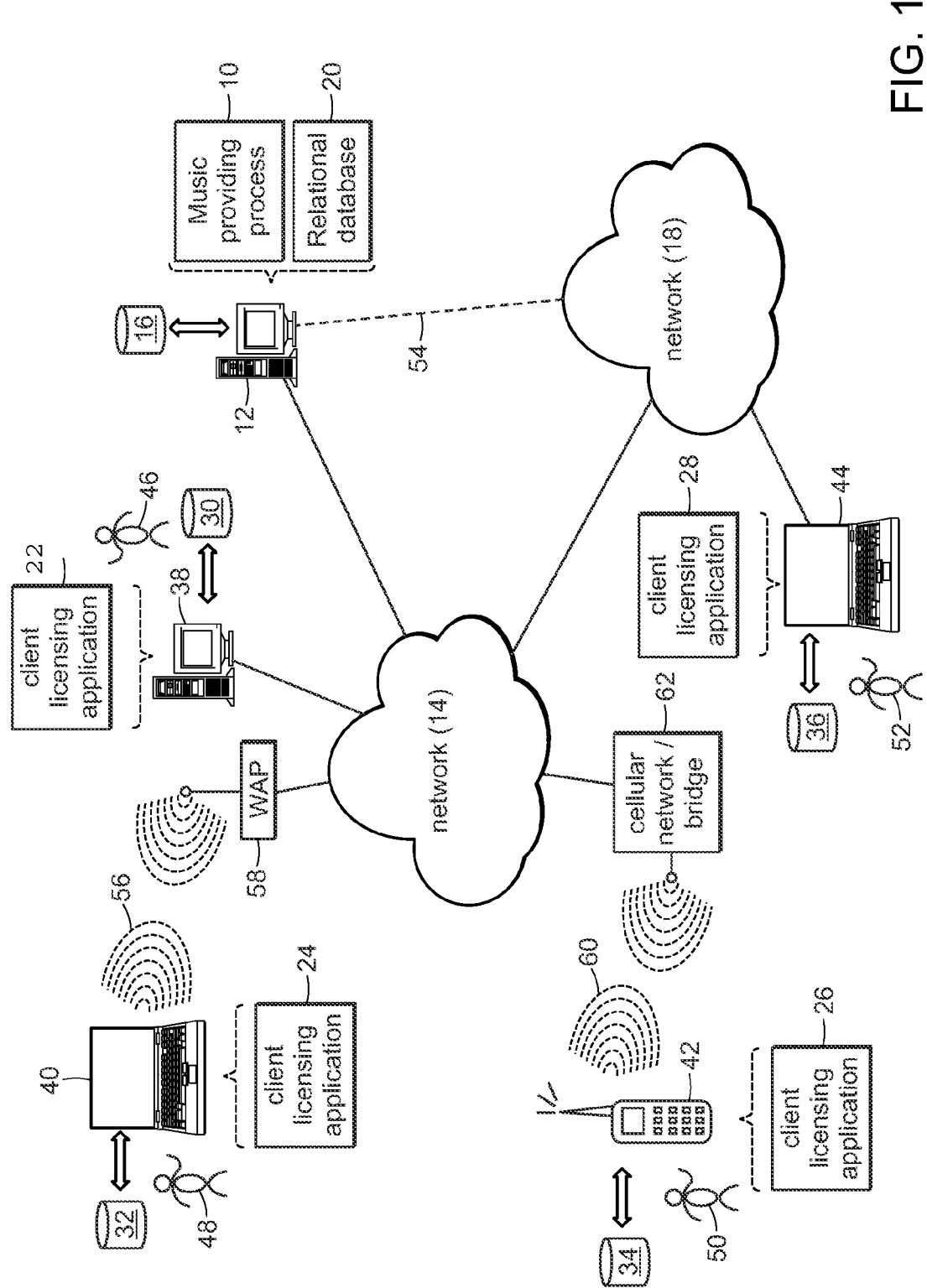
FIG. 1 is an exemplary embodiment of the music providing process of the present disclosure.

As will be appreciated by one skilled in the art, the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc.

Computer program code for carrying out operations of aspects of the present invention may be written in an object oriented programming language such as Java, Smalltalk, C++ or the like. However, the computer program code for carrying out operations of aspects of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown music providing process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both), for example.

In some embodiments, server computer 12 and associated storage device 16 may be associated with a cloud computing architecture. Accordingly, server computer 12 and/or storage device 16 may include numerous computers and/or storage devices distributed over a network, such as network 14.

For the purposes of this disclosure, the term "cue" as used herein is meant to refer to a singular musical composition. As will be discussed below in greater detail, music providing process 10 may include storing a plurality of cues in a memory, each of the plurality of cues having a plurality of tags associated therewith, the plurality of tags including both musical and non-musical tags. The method may further include receiving an input at a computing device, the input corresponding to at least one of the plurality of tags. The method may also include searching the memory of the computing device to locate at least one of the plurality of cues having at least one tag that corresponds to the input and providing a cue having the at least one tag that corresponds to the input to a client device.

The instruction sets and subroutines of music providing process 10, which may be stored on storage device 16 coupled to server computer 12, may be executed by one or more processors (not shown) and one or more memory architectures (not shown) incorporated into server computer 12. Storage device 16 may include, but is not limited to, a hard disk drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include, but are not limited to, a local area network; a wide area network; or an intranet, for example.

Server computer 12 may include a relational database 20 as well as a server licensing application. In some embodiments, server computer 12 may utilize a database management system such as, but not limited to, "My Structured Query Language (MySQL) in order to provide multi-user access to one or more databases such as relational database 20. Music providing process 10 may be a stand alone application that interfaces with relational database 20 or an applet/application that is executed within server licensing application. Although relational database 20 is shown as being within server computer 12, it is envisioned that database 20 may be, in whole or in part, distributed in a cloud computing topology. In this way, server computer 12 and storage device 16 may refer to multiple devices, which may also be distributed throughout the network.

The instruction sets and subroutines of client licensing applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include, but are not limited to, hard disk drives, tape drives, optical drives, RAID arrays, random access memories (RAM), read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client licensing applications 22, 24, 26, 28, users 46, 48, 50, 52 may access relational database 20 to access and/or locate one or more cues.

In some embodiments, users 46, 48, 50, 52 may access relational database 20 directly through the device on which the client licensing application (e.g., client licensing applications 22, 24, 26, 28) is executed, namely client electronic devices 38, 40, 42, 44, for example. Users 46, 48, 50, 52 may access relational database 20 directly through network 14 or through secondary network 18. Further, server computer 12 (i.e., the computer that executes the server application) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example.

Client electronic devices 38, 40, 42, 44 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

In some embodiments, music providing process 10 may be a server-side process, a client-side process, or a hybrid server-side/client-side process. Accordingly and for the following disclosure, music providing process 10 shall collectively refer to any and all combinations of server-side music providing process 10 and/or client-side licensing processes.

For example, server-side music providing process 10 may reside on and may be executed by server computer 12, which may be connected to network 14 (e.g., the Internet or a local area network). Examples of server computer 12 may include, but are not limited to, a personal computer, a server computer, a series of server computers, a mini computer, and a mainframe computer. Server computer 12 may be a web server (or a series of servers) running a network operating system, examples of which may include but are not limited to, Microsoft® Windows® XP Server; Novell® NetWare® or Red Hat® Linux®, for example.

For the following discussion, communication between server computer 12 and client licensing application 22 is going to be described for illustrative purposes. However, this is not intended to be a limitation of this disclosure, as other client licensing applications (e.g., client licensing applications 24, 26, 28) may be equally utilized.

As shown in FIG. 1, a computing device, such as server computer 12 may include relational database 20. As discussed above, relational database 20 may work in conjunction with a relational database management system, which may include, but is not limited to MySQL available from Sun® Microsystems. Relational database 20 may be located in any suitable memory location such as within storage device 16 coupled to server computer 12 and/or as part of a larger cloud computing infrastructure.

In some embodiments, relational database 20 may include a number of cues. As discussed above, the term "cue" may refer to a singular musical composition. Each cue in relational database 20 may have one or more tags associated therewith, which may be used to classify and/or identify each cue. These tags may include both musical and non-musical tag information.

In some embodiments, a computing device, such as server computer 12 may be configured to receive an input from one or more client electronic device, for example, client electronic devices 38, 40, 42, 44. The input, which may be entered by a user via a client licensing application, may correspond to one or more of the tags. Server computer 12 may receive the input over network 14 and may search relational database 20 to locate one or more cues that have at least one tag that corresponds to the input entered by the user.

Relational database 20 may provide clients, such as users 46, 48, 50, and 52, with a way of searching for and discovering music in a fast, logical and efficient manner. Specifically, the systems and methods of the present disclosure may enable users such as these to search using a variety of terms that are not available and not provided for in existing music search databases.

In some embodiments, server computer 12 may allow for an assignment of one or more tags based upon, at least in part, a categorization algorithm and custom tagging. The categorization algorithm may identify related tags based on the custom, human assigned tags and relationships that currently exist in the database. The database essentially becomes "smarter" as the amount of data increases, learning from itself. Once the algorithm identifies relationships that are similar (or the same), it may add these relationships to the new cue (song). This dual approach may allow for the assignment of tags to cues using both automated and manual entry of tag information. As a result, relational database 20 may be updated periodically (e.g., on a daily basis) based on current industry and popular culture trends.

In some embodiments, relational database 20 may include a cues table, which may contain an entry for each cue in the database. For each individual cue located in the cues table there may be a plurality of description tables, which may exist to serve as descriptions for each individual cue.

For example, some description tables may include, but are not limited to, instruments, scenes, similar bands, television shows, mood, tempo, genre, subgenre, lyrics, and non-musical tags. The instrument table may identify any instruments that the cue contains (e.g., guitar, drums, cello, etc). The scene table may include the type of television or film scene this cue could fit in (e.g., break-up, love, chase, heist, etc). The similar band table may include any current or past musical artists who have a similar sound to this cue (e.g., Green Day, Coldplay, Elvis, The Beatles, etc). The television show table may identify the type of television show that this cue might fit (e.g., cooking show, reality show, sports, etc). The mood table may indicate the kind of mood that this cue fits in (e.g., happy, sad, uplifting, etc.). The tempo table may be indicative of the tempo of the cue (e.g., aggressive, slow, upbeat, etc). The genre table may identify the genre of the cue (e.g., rock, hip hop, etc). Similarly, the subgenre table may identify a subgroup to the genre (e.g., rock->indie, rap->west coast, etc). The lyric table may identify any featured lyrics in a cue (e.g., "I love you baby", etc). The non-musical tag table may include general descriptors that may apply to a cue that do not fit in with any of the other available options. The relevant format table may identify the format of the programming that the cue might suit (e.g., drama, reality, comedy, etc.).

Some non-musical tags may include, but are not limited to: film directors who have a specific style (e.g., Wes Anderson, David Fincher, etc.); movies and shows (e.g., Greys Anatomy, Juno, Oceans 11, James Bond); popular culture references (e.g., Apple commercials, World of Warcraft, Perez Hilton, Starbucks, etc.). Non-musical tags may be related to music that inspires or incites a similar feeling or mood. For example, using James Bond as a tag would produce music that could be mysterious and sinister as well as driving (upbeat) and filled with adventure. The relationship could also be based on a style of music that this person, brand or reference is associated with (in the case for film directors, television shows and companies). For example, Starbucks might be associated with music that is fitting for a coffee shop—perhaps acoustic, singer-songwriter music.

Figure 3:
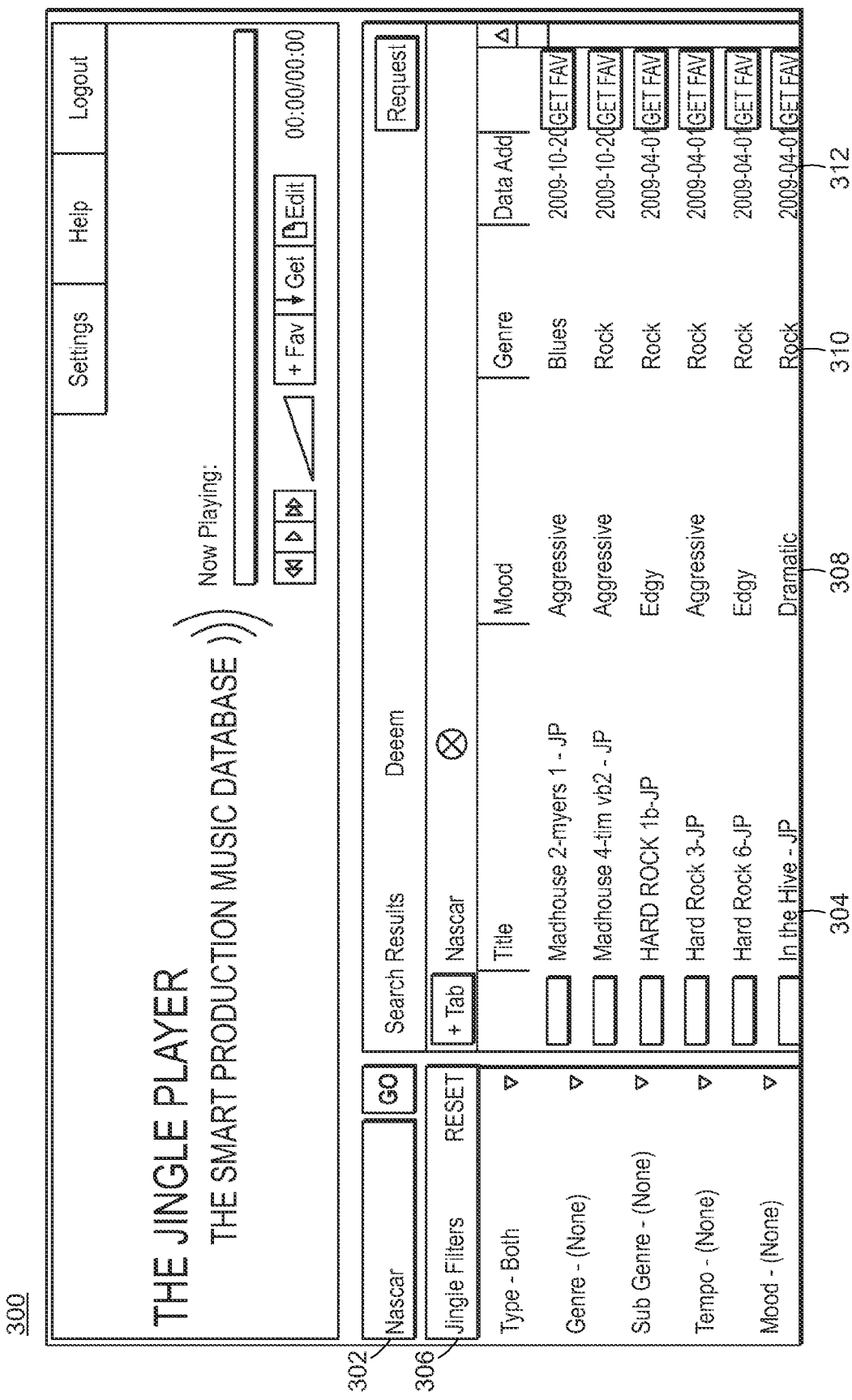
FIG. 3 is an exemplary embodiment depicting portions of the music providing process of the present disclosure.

Referring now to FIGS. 2-3, exemplary display panels 200 and 300, which may be associated with a client licensing application (e.g., 22, 24, 26, or 28) are shown. As discussed above, the description tables associated with relational database 20 may allow a user, e.g., user 46, 48, 50, or 52, to enter one or more search terms (i.e., input) that are musical and/or non-musical in nature and receive results from relational database 20 at client licensing application 22, 24, 26, and/or 28.

In some embodiments, the display panels (e.g., display panel 200) may be associated with an application, such as client licensing application 24 and may be displayed to a user at a computer (e.g., user 48 at computing device 40). Display panel 200 may include at least one search field 202, which may allow a user to enter one or more search terms. For example, and as shown in FIG. 2, a user may enter an input or term such as "acoustic". Server computer 12 may receive the input over network 14 and may search relational database 20 to locate one or more cues that have at least one tag that corresponds to the input entered by the user. The results of this search may then be sent to the user's computer, in this example, computing device 40 for display. These cues may be displayed at search results table 204.

In some embodiments, display panel 200 may also provide the user with the ability to filter the result set using filter 206. While filter 206 displays type, genre, sub-genre, tempo and mood in FIG. 2, it is envisioned that filtering may be performed in accordance with any or all of the description tables listed above. Display panel 200 may also indicate the mood of the cue, the genre of the cue, and the date the cue was added to relational database 20 using mood field 208, genre field 210 and date added field 212. Numerous other fields may also be listed without departing from the scope of the present disclosure.

Referring again to FIG. 3, a display panel 300, which may be associated with a client licensing application is shown. As discussed above, music providing process 10 may be capable of searching relational database 20 based upon a non-musical input. For example, server computer 12 may receive an input from a user (e.g., user 48 at computing device 40). In this example, the user may enter the term "Nascar" in search field 302. Server computer 12, upon receiving the input may then search memory 16 to locate one or more cues having at least one tag that corresponds to the "Nascar" input. These cues may be provided to the user and displayed in search results table 304.

In some embodiments, the system of the present disclosure may be a pre-licensed music licensing system. The term "pre-licensed music" as used herein refers to music that has been cleared for use in one or more media outlets. Accordingly, all of the cues associated with relational database 20 may be licensed prior to entry within the database.

Figure 4:
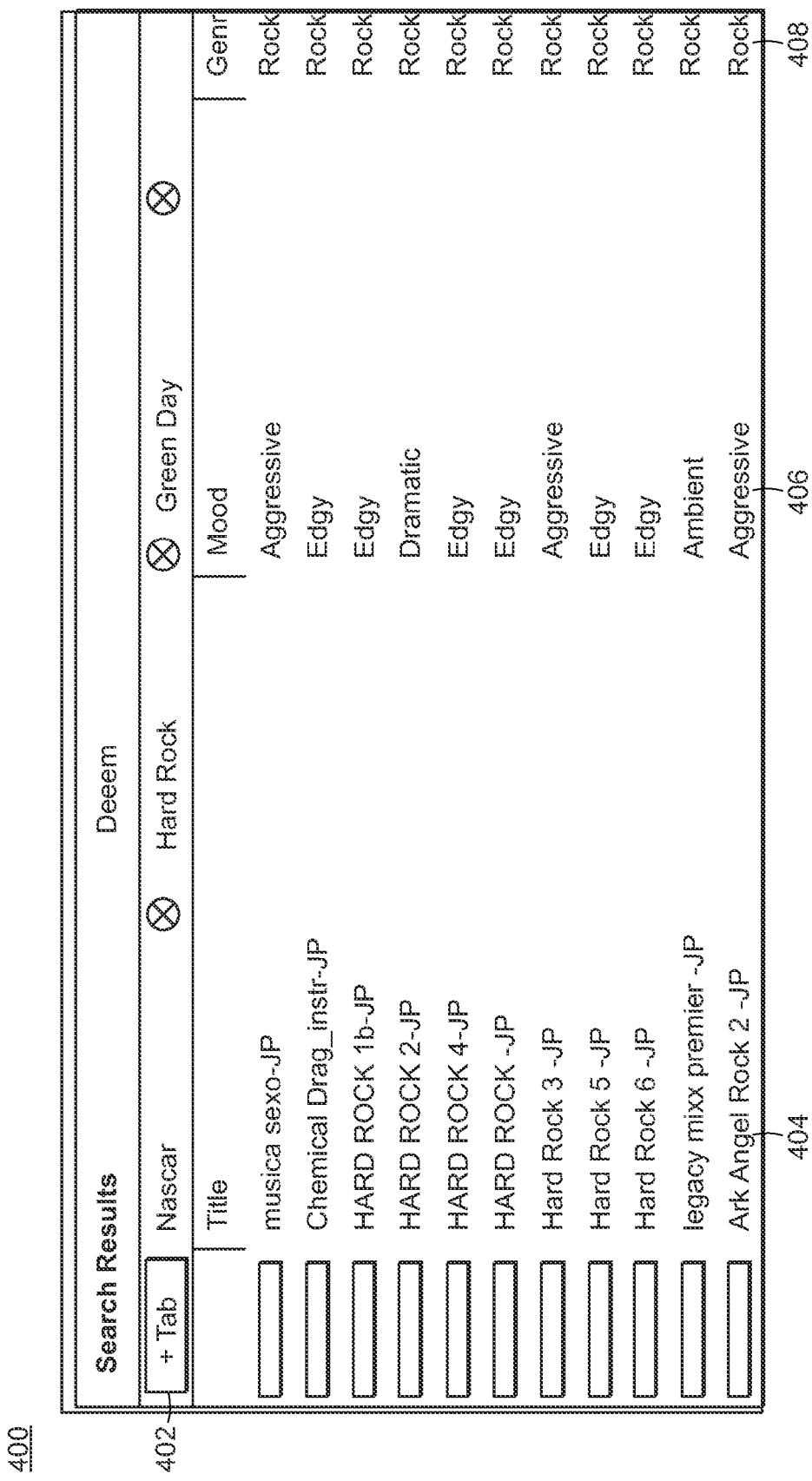
FIG. 4 is an exemplary embodiment depicting portions of the music providing process of the present disclosure.

Referring now to FIG. 4, a display panel 400, which may be associated with a client licensing application is shown. Music providing process 10 may allow for the generation of display panel 400, which may include multi-tabbed search results field 402. Multi-tabbed search results field 402 may allow for the generation of multiple searches without losing the results of a previous search by utilizing a tabbed-interface. For example, a user may select one of the tabs from multi-tabbed search results field 402, i.e., "Nascar", "Hard rock", and 'Green Day". Once selected, previously saved search results may be displayed in search results table 404. Display panel 400 may also include a number of additional fields including, but not limited to, mood field 406 and genre field 408.

Referring now to FIG. 5, a display panel 500, which may be associated with a client licensing application is shown. Music providing process 10 may allow for the generation of display panel 500, which may allow for the audition of one or more of the plurality of cues at a computing device (e.g., computing device 40). In this way, users, such as user 48, may be allowed to listen to cues before they download them using an easy to use player interface. Display panel 500 may provide a favorite option 502, a download option 504, and an edit track option 506. Numerous other features may also be associated with display panel 500 such as fast forward/rewind/pause feature 508 and duration indicator 510.

Referring now to FIG. 6, another display panel 600 associated with client licensing application is shown. Music providing process 10 may allow for the generation of display panel 600, which may allow a particular user to download one or more cues. Display panel 600 may contain a number of features including, but not limited to, search results table 602, mood field 604, genre field 606, and date added field 608. Display panel 600 may also include download option 610 and favorites option 612. In this way, a user may select one or more cues from the display for downloading.

Figure 7:
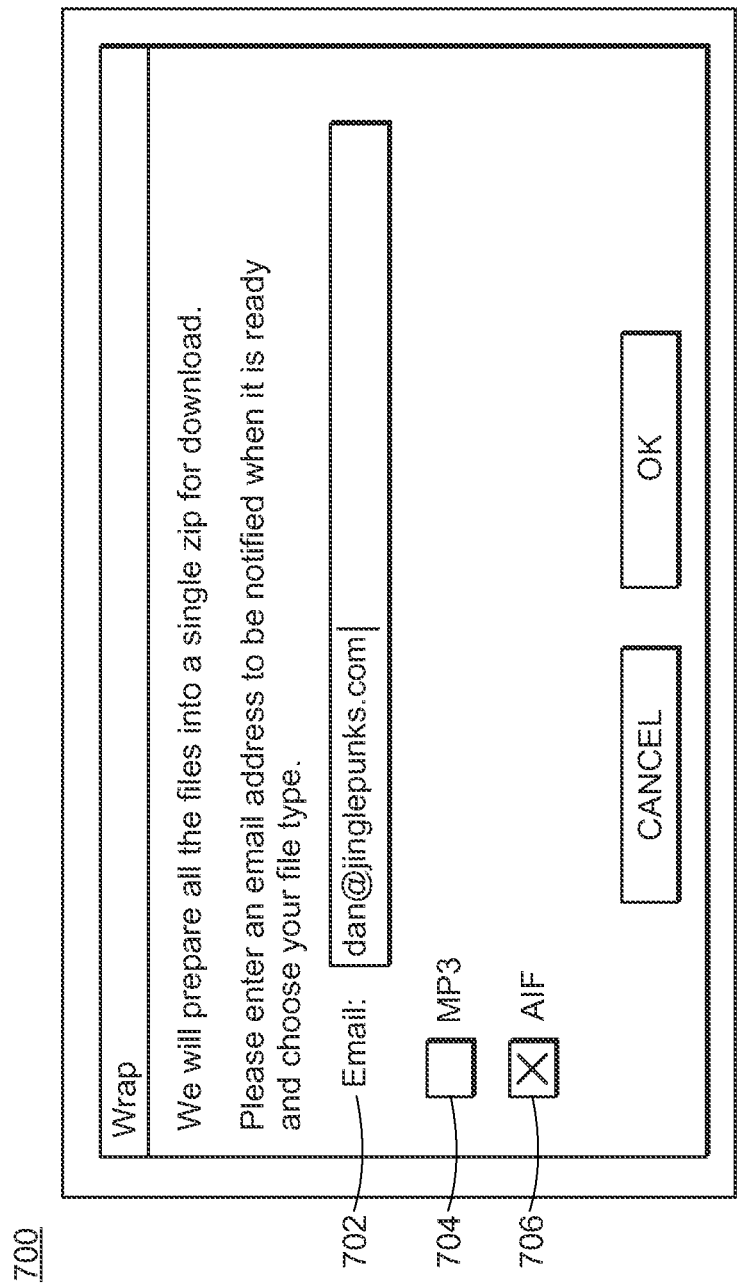
FIG. 7 is an exemplary embodiment depicting portions of the music providing process of the present disclosure.

Referring now to FIG. 7, a display panel 700 associated with client licensing application is shown. Music providing process 10 may allow for the generation of display panel 700, which may include a wrap feature that may allow a user to download a group of cues that they placed into a playlist in one click. Display panel 700 may prompt the user to enter an email address in email field 702 to which a link to a single zip file containing all the selected cues will be electronically mailed. Display panel 700 may provide the option of selecting various types of file formats through file format selection options 704 and 706. Some formats may include, but are not limited to, MPEG-1 Audio Layer 3 (MP3) file formats and Audio Interchange File Format (AIF).

Figure 8:
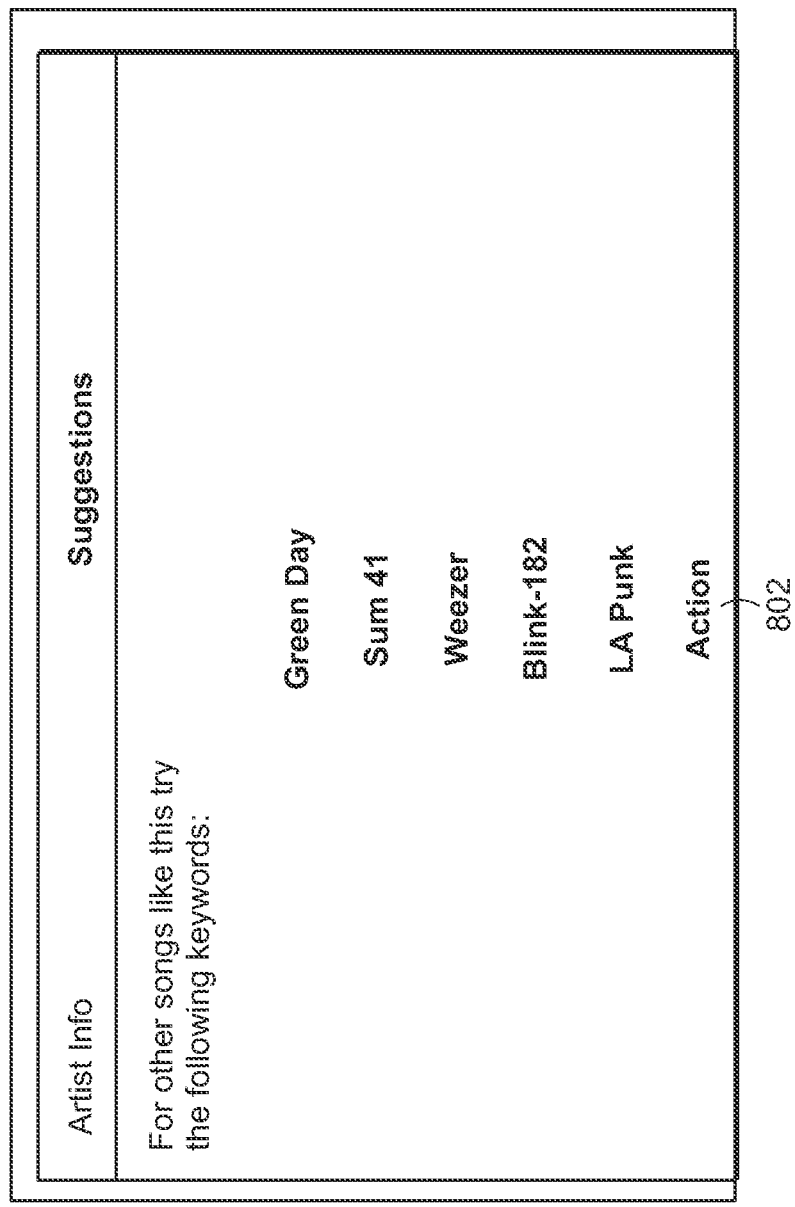
FIG. 8 is an exemplary embodiment depicting portions of the music providing process of the present disclosure.

Referring now to FIG. 8, a display panel 800 associated with client licensing application is shown. Music providing process 10 may allow for the generation of display panel 800, which may be configured to provide a suggestion of an additional search term based upon, at least in part, the input entered by the user. In this way, music providing process 10 may make suggestions for the client based upon on their search term. The search term may be received at server computer 12 and the suggestion may be provided over the network to the user's computing device. For example, if user 48 entered the search term "Green Day", music providing process may provide one or more suggestions, such as "Sex Pistols" or "Rowdy". In the specific embodiment shown in FIG. 8, after entering a particular search term, display panel 800 is shown providing six separate suggestions in suggestion field 802, i.e., "Green Day", "Sum 41", "Weezer", "Blink182", "LAPunk", and "Action". In some embodiments, this may be performed on a cue-by-cue basis. The user may select one of the suggestions, which may launch a new tab search for the client. The suggestion may be determined using a categorization algorithm and/or a custom recommendation, which may be provided by a music expert having access to computing device 12.

Figure 9:
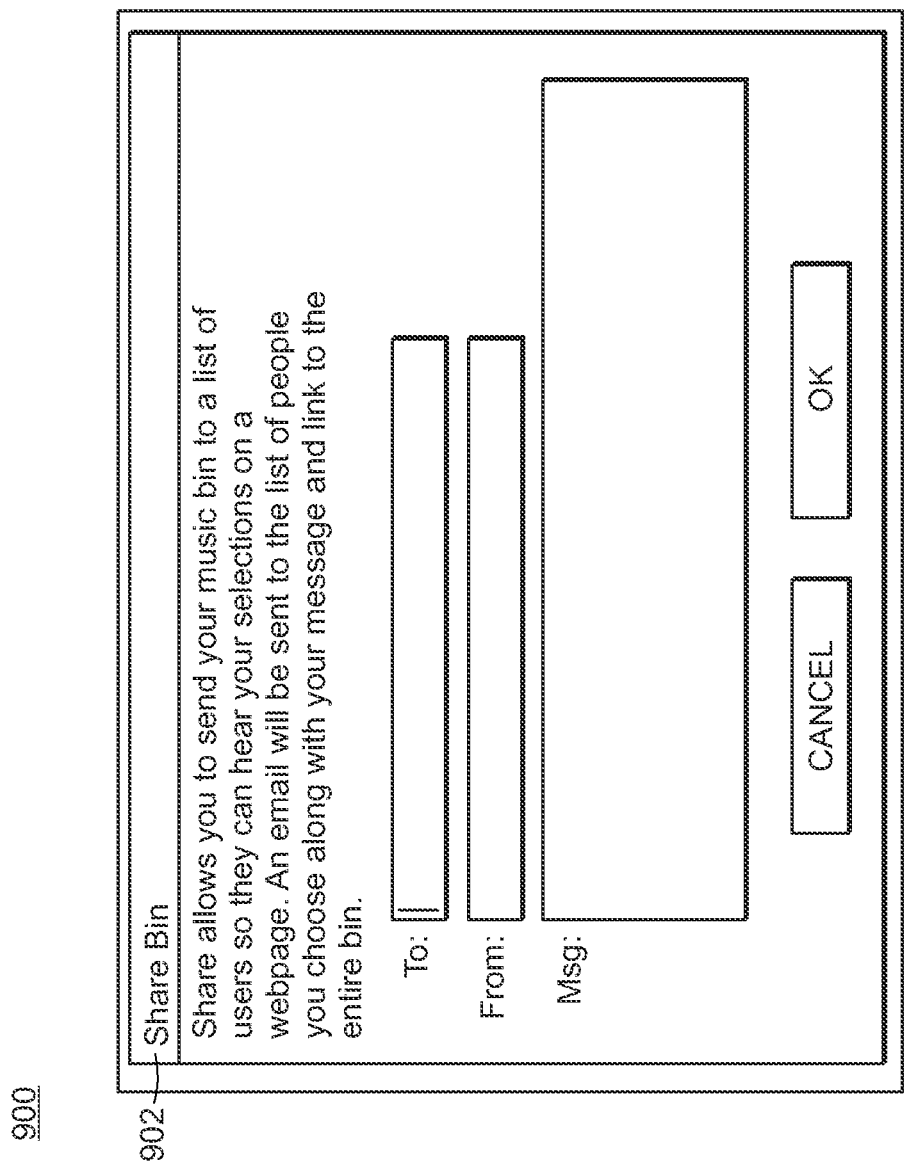
FIG. 9 is an exemplary embodiment depicting portions of the music providing process of the present disclosure.
Figure 10:
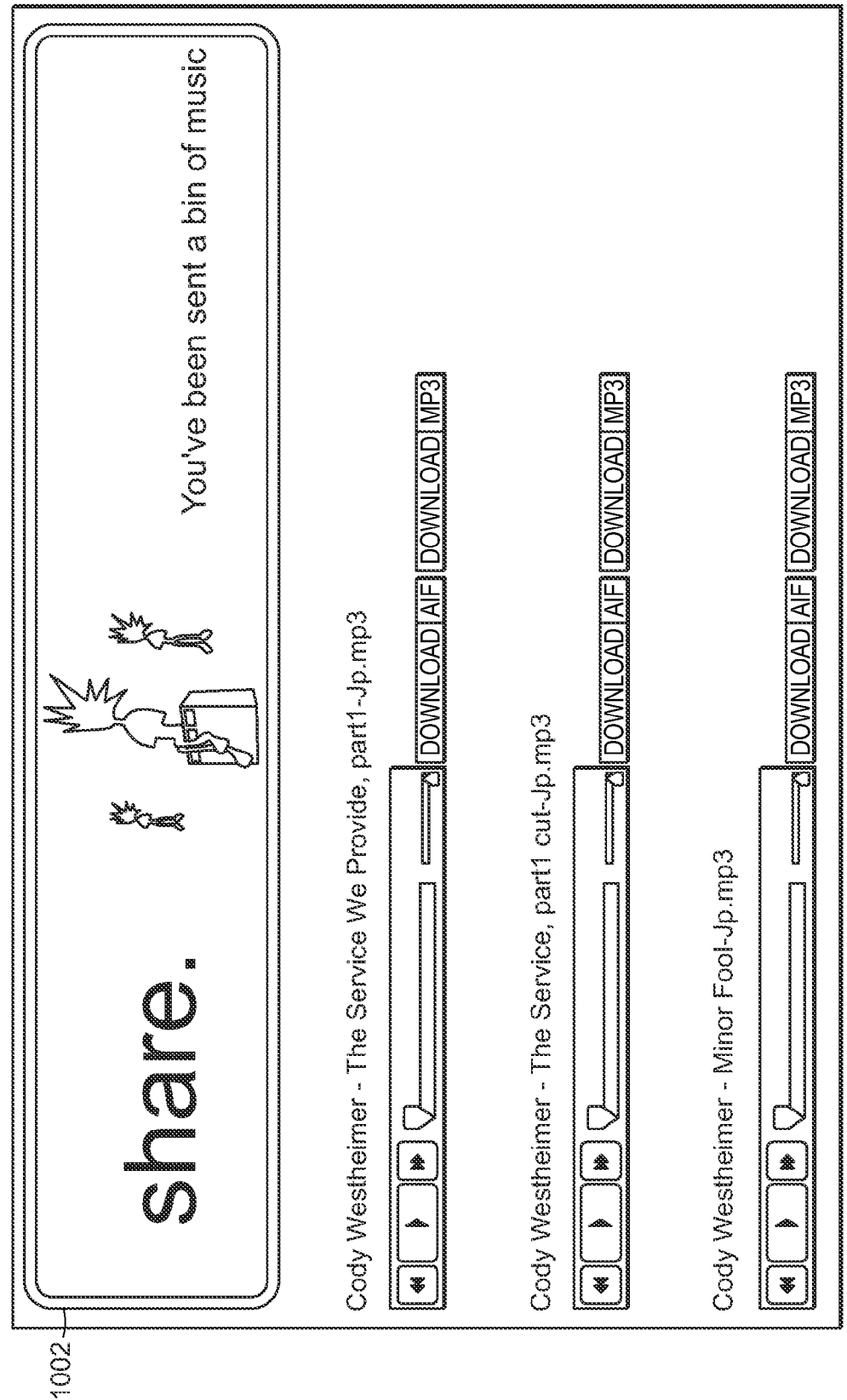
FIG. 10 is an exemplary embodiment depicting portions of the music providing process of the present disclosure.

Referring now to FIGS. 9-10, display panels 900 and 1000 associated with client licensing application are shown. Music providing process 10 may allow for the generation of display panel 900, which depicts a share bin, which may allow one particular user to share his/her playlist with other users. For example, music providing process 10 may allow for the creation of unlimited playlists or bins, which may be named by the user. Each bin may be filled with cue selections using any suitable technique, such as by clicking the favorites (FAV) button as shown in FIG. 6.

In some embodiments, music providing process 10 may allow users to share a playlist with users outside of client application 24. By selecting a "share" icon (not shown), music providing process 10 may prompt the user for information on who will receive the shared link and what the message will say as shown in FIG. 9. Music providing process 10 may be configured to allow for the creation of "bins" of favorites that you can access at any time and quickly put favorite cues in. Then from this one can share one cue with anyone inside and outside the system, but also share a whole "bin" of favorites with anyone inside and outside the system. Further, music providing process 10 may provide the ability to share inside the system but also outside the system with anyone via email (without them having to log in); ability to make "bins" of favorites, title the bins according to how they will be used and therefore to easily organize music for the use of editing into media; the ability to share not only one song but whole "bins" of music inside and outside the system. In some embodiments, an entire bin or playlist of music may be downloaded using the wrap function (e.g., which may be possible via selecting a button).

As shown in FIG. 10, music providing process 10 may allow for the generation of display panel 1000, which may be displayed on the recipient's computer. Once a user enters the data, a static webpage 1002 may be visible outside the client application environment where the clients (and those who were shared) may demo the tracks. For example, user 48, through music providing process 10, may share a bin of music with user 50, who may or may not have the client application installed on computing device 42.

Referring now to FIG. 11, a display panel 1100 associated with client licensing application is shown. Music providing process 10 may allow for the generation of display panel 1100, which may include request screen 1102, which may be configured to allow a user who is "stuck" or unable to find the exact music they are looking for to request music from music providing process 10. Submitting the request for a recommendation may alert administrators associated with server computer 12 with an email that indicates that a user is looking for a specific type of music. Music providing process 10 may then allow for the creation of a new music bin/playlist which may be provided to the user's computing device and thus visible to the user with music we believe fits their request.

Figure 12:
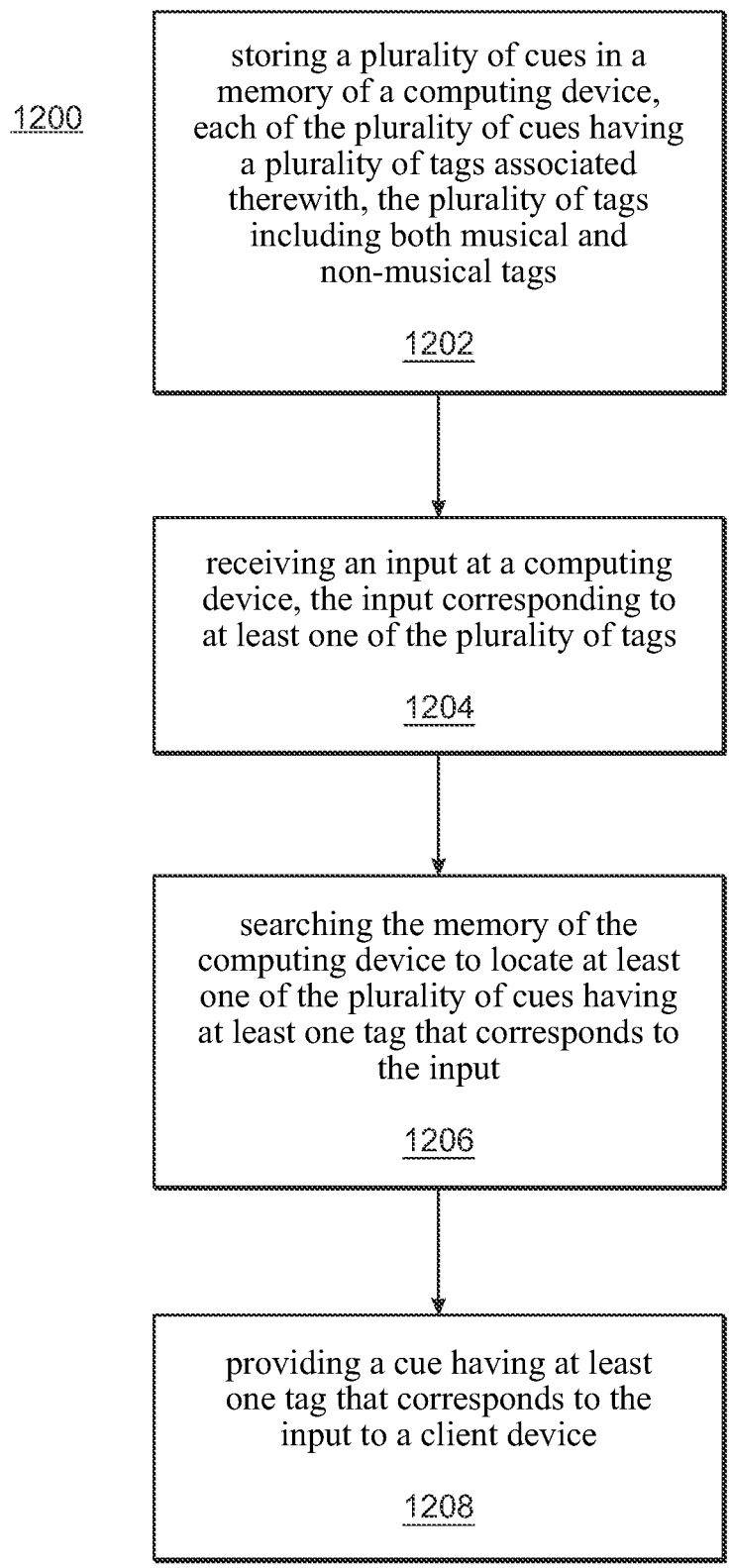
FIG. 12 is an exemplary embodiment depicting operations in accordance with the music providing process of the present disclosure.

Referring now to FIG. 12, a method 1200 depicting operations in accordance with music providing process 10 is provided. Operations may include storing a plurality of cues in a memory of a computing device, each of the plurality of cues having a plurality of tags associated therewith, the plurality of tags including both musical and non-musical tags (1202). Operations may further include receiving an input at the computing device, the input corresponding to at least one of the plurality of tags (1204) and searching the memory of the computing device to locate at least one of the plurality of cues having at least one tag that corresponds to the input (1206). Operations may also include providing a cue having the at least one tag that corresponds to the input to a client device (1208). Numerous additional operations are also envisioned without departing from the scope of the present disclosure.

The flowchart and block diagrams in the Figures illustrate the architecture, functionality, and operation of possible implementations of systems, methods and computer program products according to various embodiments of aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A number of implementations have been described. Nevertheless, it will be understood that various modifications may be made. Accordingly, other implementations are within the scope of the following claims.

What is claimed is:

1. A system for providing music comprising:
    a database including a plurality of cues, each of the plurality of cues having a plurality of tags associated therewith, the plurality of tags including both musical and non-musical tags, wherein the plurality of cues includes a plurality of songs, and wherein at least one non-musical tag is related to at least one of the plurality of cues having a similar feeling and includes at least one of film directors, movies, television shows, and popular culture references; and a computing device configured to receive an input corresponding to the at least one non-musical tag, the computing device further configured to search the database to locate at least one of the plurality of cues having at least one tag that corresponds to the input and is related to the similar feeling of the at least one non-musical tag, the computing device further configured to provide a cue having the at least one tag that corresponds to the input and is related to the similar feeling of the at least one non-musical tag to a client device.

2. The system of claim 1 wherein the input is a non-musical search term.

3. The system of claim 1 wherein the computing device is further configured to provide a plurality of search results in a multiple tab format.

4. The system of claim 1 wherein the computing device is further configured to identify related tags of the plurality of tags based upon, at least in part, at least a portion of the plurality of tags and relationships currently in the database.

5. The system of claim 4 wherein the computing device is further configured to automatically add one or more of the related tags to a new cue in the database based upon, at least in part, the relationships currently in the database.

6. The system of claim 1 wherein the licensing system is a pre-licensed music licensing system.

7. The system of claim 1 wherein the computing device is further configured to provide a suggestion of an additional search term based upon, at least in part, the input.

8. The system of claim 7 wherein the suggestion is determined in accordance with at least one of a categorization algorithm and a custom recommendation.

9. The system of claim 1 wherein the computing device is further configured to allow for the creation of at least one playlist.

10. The system of claim 9 wherein the computing device is further configured to enable the sharing of the at least one playlist.

11. The system of claim 1 wherein the computing device is further configured to receive a request for a recommendation pertaining to a particular type of music.

12. The system of claim 11 wherein the computing device is further configured to provide the recommendation to the client device.

13. A method comprising:
storing a plurality of cues in a relational database of a computing device, each of the plurality of cues having a plurality of tags associated therewith, the plurality of tags including both musical and non-musical tags, and wherein the plurality of cues includes a plurality of songs, and wherein at least one of the non-musical tags is related to at least one of the plurality of cues having a similar feeling and includes at least one of film directors, movies, television shows, and popular culture references;

receiving an input at the computing device, the input corresponding to the at least one non-musical tag;

searching the relational database of the computing device to locate at least one of the plurality of cues having at least one tag that corresponds to the input and is related to the similar feeling of the at least one non-musical tag; and providing a cue having the at least one tag that corresponds to the input and is related to the similar feeling of the at least one non-musical tag to a client device.

14. The method of claim 13 wherein the input is a non-musical search term.

15. The method of claim 13 further comprising providing a plurality of search results in a multiple tab format.

16. The method of claim 13 further comprising identifying related tags of the plurality of tags based upon, at least in part, at least a portion of the plurality of tags and relationships currently in the database.

17. The method of claim 16 further comprising automatically adding one or more of the related tags to a new cue in the database based upon, at least in part, the relationships currently in the database.

18. The method of claim 13 wherein the licensing system is a pre-licensed music licensing system.

19. The method of claim 13 further comprising suggesting an additional search term based upon, at least in part, the input.

20. A computer program product residing on a computer readable medium having a plurality of instructions stored thereon which, when executed by a processor, cause the processor to perform operations comprising:
storing a plurality of cues in a relational database of a computing device, each of the plurality of cues having a plurality of tags associated therewith, the plurality of tags including both musical and non-musical tags, wherein the plurality of cues includes a plurality of songs, and wherein at least one of the non-musical tags is related to at least one of the plurality of cues having a similar feeling and includes at least one of film directors, movies, television shows, and popular culture references;

receiving an input at the computing device, the input corresponding to the at least one non-musical tag;

searching the relational database of the computing device to locate at least one of the plurality of cues having at least one tag that corresponds to the input and is related to the similar feeling of the at least one non-musical tag; and providing a cue having the at least one tag that corresponds to the input and is related to the similar feeling of the at least one non-musical tag to a client device.

* * * * *